Figure 1:
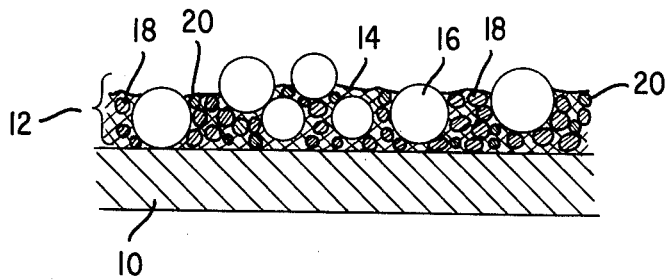

May 29, 1962   J. A. POOLE   3,036,928
RETROREFLECTIVE COMPOSITION AND METHOD OF APPLYING SAME
Filed Dec. 18, 1959

INVENTOR.
JOHN A. POOLE
BY
*Malcolm W. Fraser*
ATTORNEY

United States Patent Office
3,036,928
Patented May 29, 1962

3,036,928
RETROREFLECTIVE COMPOSITION AND
METHOD OF APPLYING SAME
John A. Poole, Lexington, Mass., assignor, by mesne assignments, to Cataphote Corporation, Toledo, Ohio, a corporation of Ohio
Filed Dec. 18, 1959, Ser. No. 860,459
16 Claims. (Cl. 117—33)

This invention relates to a light reflective composition for marking surfaces and more particularly to a traffic-marking composition which is applied as a hot thermoplastic material and which is essentially free of volatile materials. The resulting marked surface is capable of retro-reflecting light from such sources as headlight beams.

The term retroreflection is hereinafter used to designate a reflective surface or area which will reflect an incident beam or ray of light in such a manner that a brilliant cone of light is selectively returned to the source even though the incident light strikes the reflecting surface at an angle. Thus the term distinguishes this type of reflection from that achieved by a mirror which gives a specular reflection and from a diffusing surface which diffuses or dissipates the incident light in all directions.

Reflectors of the retroreflecting type are generally employed where the incident beam strikes a reflecting surface which is otherwise in partial or total darkness. In particular, retroreflecting surfaces are used on highway marking signs and advertising signs. In such cases, it is absolutely essential that the reflection is transmitted back to the source of the incident light, even though the incident light may strike the reflecting surface at an angle. In the case of highway marking signs it is also necessary that a maximum amount of brilliancy is retained so that the sign may be visible from a suitable distance and may be clear enough to avoid any possible misinterpretation of its meaning.

Compositions, which can be painted or otherwise deposited on a surface to form retroreflecting areas, are known in the art. However, these compositions contain volatile solvents which must be evaporated after they have been placed on the highway or resinous materials which harden by the absorption of oxygen from the atmosphere or both. The use of volatile solvents in such compositions has several drawbacks. First, the quantity of solids which may be contained in the composition is limited. This means that the amount of solids such as retroreflecting beads, pigment and permanent binder that can be laid down at any one time is limited. The limitation on the amount of solids that can be laid down also means that the marking will wear off easily. Second, the solvent used often has a tendency to react or partially dissolve the tars in road compositions such as a black top material. This in turn means that the marking becomes discolored and hence less effective. Finally, the use of solvents usually means slow drying and therefore blocking off of the marked area for an excessive period of time.

Binder compositions containing materials which harden by oxidative condensation, such as alkyd resins containing or modified by drying oils or the fatty acids of drying oils, have two major disadvantages. They attain the desired hard tough condition at a relatively slow rate which is dependent on the rate of absorption and reaction with oxygen from the ambient atmosphere and, since the oxidative condensation is a continuing reaction, they eventually are subject to embrittlement, chalking as well as development of undesirable color.

It is therefore desirable to have a composition, and particularly one suitable for traffic-marking, which is free of volatile materials and air drying materials and hence free of the drawbacks noted, which can be deposited on surfaces such as highways in any desired thickness, is more visible in rainy weather, and which will serve as a durable, effective marking.

It is therefore an object of this invention to provide a marking composition that may be applied as a liquid to areas such as roads, etc., and which, when hardened, makes the surface covered retroreflective. Another object is to provide such a composition which contains essentially no volatile or oxidative drying materials. An additional object is to provide a traffic-marking composition, having a solids content, and in particular the content of retroreflecting beads, maintained at a maximum, thus insuring maximum deposition of solid materials such as beads and pigments on the surface to be marked and hence a maximum quantity of retroreflecting beads in the deposit.

It is a further object of this invention to provide a method for marking roads with a traffic-marking composition which may be driven over very shortly after deposition. Still another object is to provide a method for laying down a relatively thick layer of marking composition and for making traffic markings which are retroreflective, easily seen under all lighting conditions even in wet weather, and which also exhibit wearability beyond that now presently achieved by paint-type compositions. These and other objects will be apparent from the following discussion.

Briefly, the marking composition of this invention comprises a nondrying thermoplastic material as a binder, retroreflective beads, pigment, and if desired, pigments, fillers and modifying agents. The binder is so chosen that it is plastic or flowable at temperatures ranging from about 150 to 350° F. and sets rapidly solely by cooling to form a hard surface which can be driven over in a few minutes after application. The composition is essentially free of solvents and by adjusting the plasticity of the binder, it is possible to formulate compositions having as much as 95% solids content, i.e., beads, pigments, and fillers, the balance being binder. The composition contains substantially no volatile material, i.e., material having a boiling point at or below the temperature of application.

Figure 2:
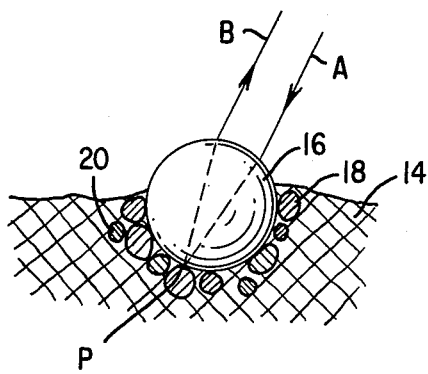

The invention will now be described in detail and with reference to the following drawing in which:

FIGURE 1 represents a much enlarged and stylized cross-sectional drawing of a surface treated with the composition of this invention and made retroreflective; and FIGURE 2 is a diagrammatic representation of the optics of retroreflection.

Although this invention is described in terms of a composition and process for traffic markings, it is to be understood that it is not limited to traffic markings but is suitable for any type of markings where light is retroreflected.

The binder which serves to hold the beads, pigment and any other solids permanently in place is chosen so that its degree of plasticity both at the time the material is applied and after it has cooled will given the desired effect. That is, the composition should be pourable or extrudable at temperatures between approximately 300 and 450° F. and should be a hard, firm surface when cooled, i.e., when at a temperature to which it is subjected to ordinary usage, such as on roads. The type and quantity of binder influences the gloss durability and compressive strength of the final marking.

The binder may be present in a range from 15 to 35% by weight of the total composition and should be an essentially colorless non-drying thermoplastic material which can be applied, i.e., poured, extruded or otherwise spread, at temperatures ranging from about 300 to 450° F. Moreover, it should set rapidly to form a hard surface at temperatures normally encountered on highways, the solidifying temperature being adjusted to be above that which is the maximum the highway surface reaches. The binder should be capable of withstanding subzero temperatures without excessive shrinking with consequent cracking. The binder should be relatively unaffected by oxidation, weathering, and free from excessive cold flow.

A suitable binder has been found to be a mixture of two styrene polymers, both of which are produced from crude mixtures of styrene and styrene homologues such as those obtained from the fractionation of the so-called "crude solvent" from "light oils" scrubbed out of coke oven or gashouse gas. Such polymers are manufactured by the Pennsylvania Industrial Chemical Corporation under the trade name of "Piccolastics." However, any other binder which meets the above requirements would be suitable.

A preferred binder is a mixture of two styrene-based polymers, one having a melting point (by the ball and ring method) of about 100° C. and the other having a melting point of about 5° C. It is preferable that the higher melting material be present in the mixture in a weight percent range from 65 to 85 percent, while the lower-melting material be present in a weight percent range of from 15 to 35 percent. The higher-melting material is soluble in xylene, viscous at 120° C. and described as a hard, tough, semi-elastic material at room temperatures. The lower-melting material is water thin at 120° C. and soluble in naphtha.

Another effective binder is provided by non-drying alkyd resins, such as phthalic acid glycol alkyds modified with a non-drying oil, for example, cocoanut oil, mixed with a transparent colorless non-drying resin of substantially higher softening point, such as hydrogenated rosin modified with maleic anhydride or glycol. A relatively small amount of a non-drying plasticizer may also be incorporated in the binder.

The pigment used will depend upon the color desired in the final markings. Although a number of pigments may be used, it has been found preferable from the point of view of economy and compounding techniques to use a titanium dioxide pigment for white pigment, and a cadmium yellow for yellow pigment in traffic markings. The choice of pigment and amounts will also influence chalking or gloss in the final marking. Such pigments are preferably present in the marking composition in a weight range ranging from 0 to 15 percent of the total composition weight.

The beads which impart the retroreflective character to the marking may be present in a range from 20 to 70% by weight of the total composition, a bead range which is much greater than has been possible to attain with known compositions. The primary role of the binder, filler and pigments is to fill the voids around the beads and to provide a matrix for the same. Preferably, the index of refraction of the beads should not be below approximately 1.3. Their index of refraction may range from approximately 1.3 to 2 or as high as practicable. The diameter of the beads used may range from about 10 to 1000 microns. The beads may be glass or plastic so long as they are of a transparent material and preferably are solid and spherical in shape but may be somewhat elliptical.

Although, it may be preferable to use in any one composition beads having diameters which do not vary by more than a factor of two or three, smaller or larger variations in diameters may be desirable. Thus, where the maximum quantity of beads is to be used a wide gradation in size is preferable. This in turn permits realizing the maximum compressive strength from the beads without sacrifice of optical properties.

In addition to pigments and beads, other solid materials may be added to the composition to achieve certain characteristics in the final marking. Thus it may be desirable to add fillers which are flattening agents and which contribute a limited amount of porosity to the final marking. For example, small quantities, i.e., up to about 3 percent of a diatomaceous earth may be added as a flattening and breathing agent. This is particularly desirable if the marking is to be applied to a concrete highway or paved surface, for there is a tendency to build up a hydrostatic head between such pavement and the marking. This in turn produces blisters, flaking and cracking off. The use of a breathing agent introduces a controlled degree of porosity into the marking and hence prevents these undesirable results.

Other fillers may include such materials as zinc oxide, asbestine, fine sand and whiting material. These fillers may themselves be pigments or pigment extenders. Asbestine is a natural fibrous magnesium silicate, pure white in color and a good inert pigment extended. The total amount of fillers (other than beads and pigment) may range from an unsubstantial quantity, i.e., as low as one percent to a substantial quantity, i.e., as much as 30 percent by weight of the total composition.

In applying the composition to the surface to be marked, it is heated to a temperature between about 300 and 450° F., depending upon the desired viscosity and the nature of the thermoplastic binder used. The composition is applied hot on the surface or pavement, and because it does not contain any volatile material may be laid in much thicker layers than a paint-type composition carrying beads. The thickness of the final marking composition may range from approximately ⅓₂ to ½ inch. Application may be achieved either by pouring, by extruding, or other spreading techniques, the choice of the method depending upon the formulation used. The marking composition of this invention cools rapidly after being laid, and is usually ready to bear normal traffic loads within five minutes. The final marking is durable, adheres permanently to the surface on which it is deposited, does not become discolored over long periods of exposure, and affords good visibility both day and night. In addition, it has a very slight amount of cold flow which, over a long period of time, allows the composition to conform to the movement (expansion, contraction, shoring) of the pavement.

In formulating the marking composition of this invention, all of the beads may be added to the composition before it is applied or some or all of the beads may be reserved and deposited in the surface of the composition after it is laid but before it cools. It is preferable to reserve a small portion of the beads which is evenly distributed over the hot surface of the composition and which sinks sufficiently far into the composition to be permanently fixed. By this process of depositing the marking composition, the top beads remain partially uncoated and hence are optically more effective for retroreflecting incident light. The beads which are thus deposited on the surface may or may not be heated.

If desired, the marking composition may be formulated into brick or blocks and then remelted at the place of use. This somewhat simplifies the problem of transportation and makes the composition readily available without the trouble of mixing on the job.

The final marking composition as deposited upon a surface is illustrated in a simplified cross-sectional drawing in FIGURE 1. In FIGURE 1 surface 10 is covered with composition 12 which consists of binder 14, permanently holding in place beads 16, pigment 18 and filler 20.

The optics of the retroreflecting surface thus formed may be described briefly with reference to FIGURE 2 in which like numbers refer to like elements. FIGURE 2 shows a single retroreflective bead 16 held in place by binder 14 and surrounded by pigment particles 18 and filler particles 20. Light ray A from a source (not shown) strikes bead 16, is focused at a point P approximately where contact is made between bead 16 and pigment 18 or filler 20. The light ray B is then reflected back approximately parallel to the incident ray A, thus achieving retroreflection by the bead and hence by the whole retroreflecting area covered by the composition of this invention.

This invention may be further illustrated by the following examples:

*Example 1*

Into a heated vat were placed 15.1 pounds of a styrene-base polymer (melting point approximately 100° C. and sold under the trade name of Piccolastic E-100) and 2.7 pounds of a styrene-base polymer (melting point approximately 5° C. and sold under the trade name of Piccolastic A-5). Sufficient heat was applied to melt the polymers and make them relatively free-flowing. Into this melted mass were added 8 pounds of Titanox RA (TiO₂ sold by Titanium Pigment Corporation), 2.3 pounds of zinc oxide, 9.3 pounds of Celite 110 (diatomaceous earth sold by Johns-Manville), 31.3 pounds of glass beads (20–200 mesh size) and 31.3 pounds glass beads (50–325 mesh size). The beads were preheated to approximately 300° F. in an oven before adding them. This is not necessary but it materially speeds up the mixing process. The resulting mixture while thoroughly agitated was brought up to a temperature of approximately 300° F. and was maintained at that temperature for about an hour with agitation. The composition thus formed was suitable for extruding on a surface such as concrete pavement, black top, etc. It was applied at approximately 300° and was ready to bear traffic five minutes after application. Prolonged testing of this marking composition indicated that it possessed good wearability. A bright white marking on paved highways was obtained and which was retroreflective day and night.

*Example 2*

A marking composition was made up in accordance with Example 1 except that 8 pounds of cadmium yellow was used in place of the 8 pounds of Titanox RA. A brilliant yellow marking was created on concrete and black top. The marking was retroreflecting both during day and night.

*Example 3*

Additional marking compositions were made up according to the following compositions:

| | A, percent by weight | B, percent by weight | C, percent by weight |
|---|---|---|---|
| Piccolastic E-100 (polystyrene, M.P. about 100° C) | 19.25 | 12.0 | 18.8 |
| Piccolastic A-5 (polystyrene, M.P. about 5° C.) | 6.5 | 6.0 | 6.4 |
| Titanox RA, Titanox RCHT, Titanox A-MO } TiO₂ from Titanium Pigment Corp | 10.0 | | 11.3 |
| Zinc Oxide | | 15.0 | 3.2 |
| Asbestine | 1.375 | 3.5 | 13.2 |
| Celite 110 (diatomaceous earth) | | | 2.8 |
| Whiting | 2.875 | | |
| Glass beads (20–200 mesh) | 30.0 | 33.5 | 44.3 |
| Glass beads (18–100 mesh) | 15.0 | 15.0 | |
| Glass beads (50–325 mesh) | | | |
| Glass beads (80–325 mesh) | 15.0 | 15.0 | |

The compositions were made up in the manner described in Example 1.

Compositions A and C were poured on surfaces while composition B was extruded.

To 12.6 parts by weight of a non-drying phthalic anhydride-glycol-cocoanut oil modified alkyd resin (Beckosol No. 23 of Reichhold Chemical Company) are added 8.4 parts of hydrogenated rosin modified with maleic anhydride and glycerol (Hg 28 of Cook Paint and Varnish Company) and 2 parts of a non-drying alkyd type polyester plasticizer (Paraplex G 60 of Rohm and Haas). The mixture is heated to a free flow condition and 19 parts of pure calcium carbonate, 11 parts of titanium dioxide, 3 parts of diatomaceous silica, 4 parts of magnesium silicate, 40 parts of glass beads and ¼ part of a dispersant such as diglycol laurate S of Glyco Chemical Company are stirred in.

All of these gave surfaces with good retroreflecting characteristics during both day and night and they exhibited good wearing qualities.

It will be seen from the above description of this invention that there is provided a composition and a method of using this composition for marking areas, particularly highways, so that the marked areas are capable of reflecting light back to the source from which the light originated. Furthermore, the marking composition of this invention may be deposited in thicknesses heretofore unobtainable. The ability to apply these marking compositions in these thicknesses means that the beads, pigments and binders thus applied may be deposited in a manner as to impart good wearability characteristics to the markings. In addition, the additional thickness gained through the use of this composition, permits good visibility day or night. In a rain, ordinary painted retroreflecting highway markings are covered with a film of water, destroying the retroreflecting properties. The composition of this invention, on the other hand, by reason of its thicker application has improved retroreflecting properties in the rain.

It will be appreciated that considerable modification is possible in the marking composition of this invention as well as in the process of formulating and applying it without departing from the essential features of the invention.

This is a continuation-in-part of my application Serial No. 695,718, filed November 12, 1957, now abandoned.

I claim:

1. A light retroreflecting marking composition capable of being applied to a surface as a hot melt consisting essentially of a colorless normally solid non-drying thermoplastic binder softening to a flowable state on heating and hardening from such flowable state solely by cooling, pigment and, in amounts ranging from 20 to 70 percent by weight of the total composition, transparent glass beads having a softening point substantially above that of the binder and having diameters ranging from 10 to 1000 microns, said binder consisting essentially of a mixture of substantial proportions of a non-drying thermoplastic resin which is normally solid at room temperature and of a non-drying thermoplastic resin of substantially lower softening point than said normally solid resin.

2. A marking composition as defined in claim 1 wherein the binder consists essentially of polystyrene resins.

3. A marking composition as defined in claim 1 wherein the binder consists essentially of non-drying alkyd resins.

4. A marking composition as defined in claim 1 wherein the binder consists essentially of a non-drying alkyd resin modified by a colorless transparent non-drying resin of substantially higher softening point.

5. A marking composition as defined in claim 1 wherein the binder consists essentially of a non-drying alkyd resin modified by a colorless transparent non-drying resin of substantially higher softening point and a non-drying plasticizer.

6. A marking composition as defined in claim 1 wherein the binder comprises from about 15% to about 35% of the composition.

7. A marking composition as defined in claim 1 including a filler.

8. A marking composition as defined in claim 1 wherein said pigment is titanium dioxide.

9. A marking composition as defined in claim 1 wherein said pigment is cadmium yellow.

10. A marking composition as defined in claim 1 wherein said binder consists essentially of 65 to 85 percent by weight of a polystyrene having a melting point of approximately 100° C. and 35 to 15 percent by weight of a polystyrene having a melting point of approximately 5° C.

11. A light retroreflecting marking composition capable of being applied to a surface as a hot melt consisting essentially of from about 15 to 35 percent of a normally solid non-drying thermoplastic binder softening to a flowable state on heating and hardening from such flowable state solely by cooling, from about 0 to 15 percent of a pigment and from about 20 to 70 percent of transparent retroreflecting beads having a softening points substantially above that of the binder, the remainder of the composition not exceeding about 30% being filler, said binder consisting essentially of a mixture of substantial proportions of a non-drying thermoplastic resin which is normally solid at room temperature and of a non-drying thermoplastic resin of substantially lower softening point than said normally solid resin.

12. A marking composition as defined in claim 11 wherein the filler includes a material capable of introducing a limited degree of porosity in the composition when hardened.

13. A marking composition as defined in claim 12 wherein said material capable of introducing porosity in the marking composition is diatomaceous earth.

14. A process for making a solid surface retroreflective which comprises applying thereto a layer of marking composition thickness between about 1/32 and 1/2 inch at a temperature between about 300° F. and 450° F., said marking composition consisting essentially of from about 15 to 35 percent of a normally solid non-drying thermoplastic binder softening to a flowable state on heating and hardening from such flowable state solely by cooling, from about 0 to 15 percent of a pigment and from about 20 to 70 percent of transparent retroreflecting beads having a softening point substantially above that of the binder, the remainder of the composition not exceeding about 30% being filler, said binder consisting essentially of a mixture of substantial proportions of a non-drying thermoplastic resin which is normally solid at room temperature and of a non-drying thermoplastic resin of substantially lower softening point than said normally solid resin.

15. A process as defined in claim 14 including the step of depositing a further portion of said beads on the surface of said layer before the composition has fully hardened.

16. Process of making a light-reflecting marking composition capable of being applied to a surface as a hot melt comprising forming into solid blocks a hot flowable mixture consisting essentially of from about 15 to 35 percent of a normally solid non-drying thermoplastic binder softening to a flowable state on heating and hardening from such flowable state solely by cooling, from about 0 to 15 percent of a pigment and from about 20 to 70 percent of transparent retroreflecting beads having a softening point substantially above that of the binder, the remainder of the composition not exceeding about 30% being filler, said binder consisting essentially of a mixture of substantial proportions of a non-drying thermoplastic resin which is normally solid at room temperature and of a non-drying thermoplastic resin of substantially lower softening point than said normally solid resin.

References Cited in the file of this patent

UNITED STATES PATENTS

| | | |
|---|---|---|
| 2,824,502 | Rockwell et al. | Feb. 25, 1958 |
| 2,882,632 | Rockwell et al. | Apr. 21, 1959 |
| 2,897,733 | Shuger | Aug. 4, 1959 |

FOREIGN PATENTS

| | | |
|---|---|---|
| 635,291 | Great Britain | Apr. 5, 1950 |